United States Patent [19]
Schlanger

[11] Patent Number: 6,074,119
[45] Date of Patent: *Jun. 13, 2000

[54] CONNECTING DEVICE INCLUDING CONNECTABLE MEMBERS AND TAPERED ELEMENT

[76] Inventor: Raphael Schlanger, 128 Hulda Hill Rd., Wilton, Conn. 06897

[ * ] Notice: Under 35 U.S.C. 154(b), the term of this patent shall be extended for 5 days.

[21] Appl. No.: 08/725,335

[22] Filed: Oct. 1, 1996

[51] Int. Cl.[7] .................................................. F16B 7/00
[52] U.S. Cl. ......................... 403/297; 403/248; 403/256; 403/343; 411/55; 411/57
[58] Field of Search .................................. 403/153, 248, 403/256, 258, 297, 342, 343; 411/55, 60, 57

[56] References Cited

U.S. PATENT DOCUMENTS

| | | | |
|---|---|---|---|
| 443,855 | 12/1890 | Johnston | 403/258 |
| 1,466,127 | 8/1923 | Gottschalt | 403/248 |
| 3,596,948 | 8/1971 | Spoehr | 411/55 X |
| 4,022,101 | 5/1977 | Helgesson | 411/60 |
| 4,295,751 | 10/1981 | Holmberg | 403/343 X |
| 4,842,485 | 6/1989 | Barber | 411/55 X |
| 4,865,364 | 9/1989 | Nobileau | 403/343 X |
| 4,929,134 | 5/1990 | Bergner | 411/55 X |
| 5,060,740 | 10/1991 | Yousef et al. | 403/343 X |
| 5,540,528 | 7/1996 | Schmidt et al. | 411/55 |
| 5,593,262 | 1/1997 | Gedeon et al. | 411/60 X |

FOREIGN PATENT DOCUMENTS

| | | | |
|---|---|---|---|
| 631004 | 11/1961 | Canada | 403/258 |
| 2004931 | 4/1979 | United Kingdom | 411/60 |

*Primary Examiner*—Donald P. Walsh
*Assistant Examiner*—Emmanuel M. Marcelo
*Attorney, Agent, or Firm*—Bachman & LaPointe, P.C.

[57] ABSTRACT

A device for forming a connection between connectable elements includes a first connectable member for facilitating the connection and a second connectable member for facilitating the connection. The second connectable member is adapted to engage the first connectable member. The first connectable member includes an opening for receiving the second connectable member. A tapered element is also provided for one of compressing the first connectable member into locking engagement with the second connectable member and expanding the second connectable member into locking engagement with the first connectable member while the second connectable member is positioned in the opening for receiving.

24 Claims, 5 Drawing Sheets

CONNECTING DEVICE INCLUDING CONNECTABLE MEMBERS AND TAPERED ELEMENT

BACKGROUND OF THE INVENTION

This invention is directed to connectors, and more particularly, to a connecting device including one of a compressible outer member and an expansible inner member, wherein at least one of the outer member is compressible into engagement with the inner member and the inner member is expansible into engagement with the outer member, both via the application therein of a tapered member, and wherein upon either the compression of the outer member or the expansion of the inner member via the tapered member, an outer surface of the inner member is caused to engage an inner surface of the outer member for forming a firm connection. Variations on this design include the use of various thread types for preventing galling with regard to the threaded connection between the tapered member and the inner member; a multi sided inner member; and an inner member including a key which is expansible into a keyway of the outer member for achieving secure engagement.

Connections between connectable elements can be achieved using a large variety of different methods and mechanisms. The most basic connectors are screws, nails, rivets, etc. However, in many cases, these connecting devices are not applicable or desirable due to the limited engagement that they provide and also due to their tendency to interfere with the use and/or operation of the elements being connected. Accordingly, for various different operations, a plurality of connectors has been designed for relieving some of these difficulties with the more simple connectors. One category of such connectors includes those having an outer surrounding member and an inner expansible member adapted to be expanded and engaged with the outer member for achieving the connection.

The following references, for example, disclose various connection devices generally including an expansible inner member and a surrounding outer member.

U.S. Pat. No. 4,892,007 to Haldric et al. disclose a device for coupling a wheel to its shaft and further for the keying of an automobile steering wheel. The device includes complimentary and cooperative male and female connection parts. One of the parts is defined by a hub integral with a wheel while the other part is carried by an end part of a shaft which is configured to define a series of cylindrical peripheral bearing surfaces. Between the bearing surfaces are provided radial abutments which define projections. This centrifugal expansion device is adapted to be disposed directly and at least partly in the end part so as to produce a radial expansion of the series of male bearing surfaces so as to achieve immobilization of the hub via the friction caused between the end part and the hub, thereby locking the same against rotation.

U.S. Pat. No. 4,940,356 to Hashimoto et al. disclose a construction for adjoining a chain stay and seat pipe to a rear dropout in a bicycle frame. The invention includes a joint of a bicycle frame which comprises a rear dropout body having projections therefrom which decrease in taper as they extend away from the body. Each projection defines an elongated screw hole extending along a longitudinal axis of the projection. The projection also defines slits extending on both sides of the screw hole. Chain stay and seat stay pipes are provided so as to surround the projection. The chain stay and seat stay pipes have gradually decreasing diameters toward the base end of the projection. A screw or wedge is provided for insertion into the screw hole to enlarge the outside circumference of the projection until it fixedly contacts the interior of the chain stay and seat stay pipes. In addition, an adhesive agent is preferably spread around the projection of the rear dropout body and inside the chain stay and seat stay pipes for supplementing the frictional connection.

U.S. Pat. No. 3,776,651 to Peter et al. disclose a hub connection for use with hollow shafts. Briefly, the Peter et al. device includes a shaft 7 for connection with a hub 8 through the expansion of inner members 1 and 4 inside shaft 7 by turning a screw 5 therein. Upon the expansion of inner members 1 and 4, shaft 7 is expanded into locking engagement with hub 8.

U.S. Pat. No. 5,253,947 to Petrzelka et al. disclose a connection for use between a tubular shaft made of a fiber composite material and a metal journal. The invention generally relates to a locking connection for transmitting torque in drive shafts. An internally and/or externally positioned metallic connecting element having a hub journal is inserted into or slid onto a tubular shaft made of a fiber composite material. The wall of the hub journal is radially plastically deformed by the application of pressure or via an expanding mandrel, for example, directed into a cavity of the internal connecting element, for forming the connection.

The prior art in general, directed to connectors having an outer member and an inner expansible member, and particularly, the patents discussed above, are deficient for a variety of reasons. For example, those connecting devices which use an expansion means having a threaded connection with the inner member generally use standard 60° threads which tend to gall and bind. Such galling and binding are even more prevalent in taper thread applications. Accordingly, in such cases, i.e., the amount of expansion force is limited. Also, in many cases, such as in Hashimoto et al., the force acquired through expansion of the inner member is not evenly distributed to the outer walls of the inner member for achieving the uniform application of force against the outer member. Also, most of the prior art connectors of this type are circular or cylindrical in shape, thereby not in themselves taking advantage of the additional anti slip characteristics available using different shapes, not shown in the prior art. Further, the gradually increasing frictional force achieved through the use of a full-length, gradually tapered means is not achieved by the prior art devices. And also, the added locking feature of cooperative expandable keys and receiving keyways for use with, most particularly, circular inner members, is not taken advantage of in the prior art. Additional drawbacks in the prior art will become further apparent below in the detailed description of the present invention.

There exists a need, therefore, for a connecting device which cures the defects of the prior art so as to connect connectable elements in a uniform manner, which prevents thread galling, and which includes supplemental anti rotation and/or anti slippage features.

SUMMARY OF THE INVENTION

The primary object of this invention is to provide an improved connection device which cures the defects of prior art connecting devices.

Another object of this invention is to provide an improved connection device including an expansible inner member and an outer surrounding member, which device provides for substantially uniform frictional force distribution between the inner and outer members.

Still another object of this invention is to provide a connection device including an expansible inner member and a partially surrounding outer member, wherein the inner member is expansible by a tapered means.

And yet another object of this invention is to provide a connection device including a surrounding outer member and an expansible inner member, wherein the expansible inner member comprises a base portion and a free portion unconnected to the base portion, for achieving enhanced expansion.

And yet another object of this invention is to provide a connection device including an inner expansible member and an outer member, wherein the inner expansible member is expandable via a tapered means and wherein the inner expansible member includes a plurality of weakened sites for enhancing expansion.

And still another object of this invention is to provide a connection device including an outer member and an expansible inner member, wherein the expansible inner member is expandable via a tapered means, and wherein the inner member includes a plurality of slots and accordingly, a plurality of unconnected leaves between the slots for expansion into connection with the outer member for enhancing expansion.

And still another object of this invention is to provide a connection device including an outer member and an expansible inner member, wherein the inner member includes a multi sided outer surface and the outer member includes a multi sided inner surface for engagement with the multi sided outer surface of the inner member for further anti slippage protection.

Another object of this invention is to provide a connection device including an outer member and an expansible inner member, wherein the expansible inner member includes at least one projection, preferably in the form of a key and the outer member includes a recess, preferably in the form of a keyway, for enhancing engagement of the inner member with the outer member and for further preventing slippage and/or rotation.

And yet another object of this invention is to provide a connection device including an outer member, an inner expansible member and a tapered means for expanding the inner member into engagement with the outer member, wherein the tapered means is engageable with the inner member via one of a plurality of thread forms which substantially prevent galling and binding.

And still another object of this invention is to provide a connection device including an outer partially compressible member, an inner member and a tapered means for compressing a portion of the outer member into engagement with the inner member, wherein the tapered means is engageable with the outer member via one of a plurality of thread forms which substantially prevent galling and binding.

Another object of this invention is to provide an expansion system for adjusting the relative dimensional fit between two mating components for finely adjusting clearances and/or for compensating for tolerances and dimensional variations between the components.

The foregoing objects and advantages are achieved by the device of the present invention for at least one of forming and adjusting a connection between connectable elements. One preferred embodiment of the device includes a first connectable member for facilitating the connection and a second connectable member for facilitating the connection. The second connectable member is adapted to engage the first connectable member. The first connectable member includes an opening for receiving the second connectable member. A tapered element is also provided for at least one of contracting the first connectable member into locking engagement with the second connectable member and expanding the second connectable member into locking engagement with the first connectable member while the second connectable member is positioned in the opening for receiving.

Additional embodiments include the second connectable member in the form of a multi sided inner member, a two-piece inner member, grooved and slotted inner members, and an inner member including an extension in the form of a key for enhancing connection strength. Other embodiments include the first connectable member as an outer member which completely surrounds the inner member, which partially surrounds the inner member, which includes a keyway for engaging a key on the inner member, and which includes a multi sided inner wall. Additional variations in the above discussed embodiments include the use of various non galling thread forms for connecting the tapered element to the inner member as well as further variations set forth in detail below.

The details of the present invention are set out in the following description and drawings wherein like reference characters depict like elements.

DETAILED DESCRIPTION OF THE PREFERRED EMBODIMENT

Figure 1:
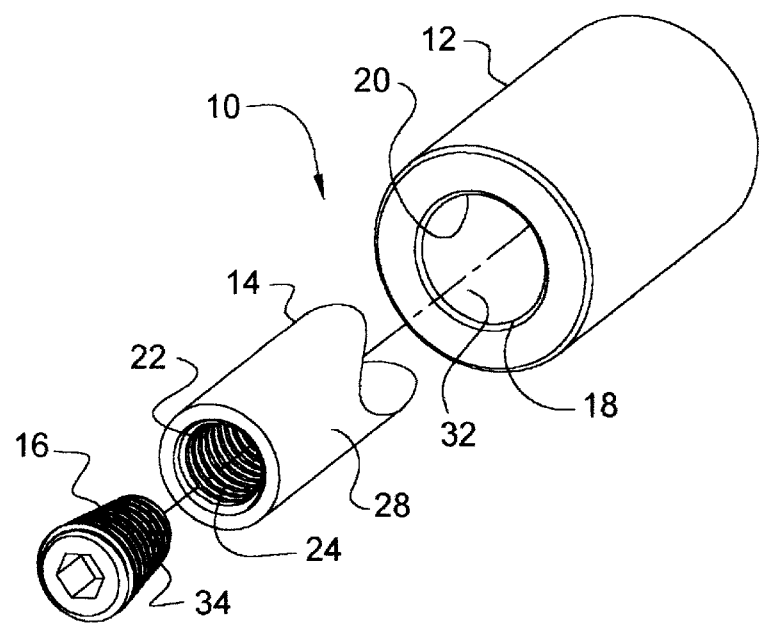
FIG. 1 is an exploded perspective view of one embodiment of the connection device in accordance with the principles of the present invention.

Referring now to the drawings in detail, there is shown in FIG. 1 an exploded perspective view of a connection and/or connection adjustment device in accordance with the principles of the present invention, which is designated generally as 10. Connection device 10 generally includes a first outer connectable member 12, a second inner connectable member 14 for insertion into outer member 12, and a tapered means 16 for expanding inner member 14 into engagement with outer member 12.

Figure 1A:
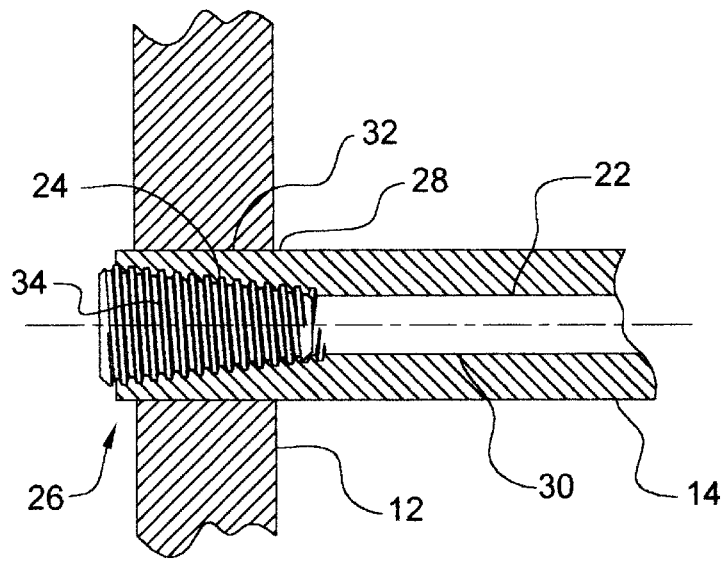
FIG. 1A is a cross sectional assembled view of the connection device shown in FIG. 1.

For the embodiments of FIGS. 1 and 1A, outer member 12 is preferably cylindrical in shape having a circular opening 18 extending therethrough and defining a circumferential wall 20. Inner member 14 is also preferably cylindrical in shape and, as shown as FIG. 1A, comprises an opening 22 therethrough which, at end 26 thereof, is in the form of a tapered female thread 24. Inner member 14 has an outer wall 28 and an inner wall 30. Outer wall 28 is adapted to be expanded into engagement with inner wall 32 of outer member 12. Such expansion is achieved using tapered means 16, which is preferably in the form of a tapered screw having a tapered male thread 34 as shown in FIG. 1A for engaging tapered female thread 24 of inner member 14. Tapered means 16 includes means such as a slot, hexagonal head, hexagonal key hole, lever or wing nut, for rotating the tapered means into engagement with female thread 24.

Accordingly, inner member 14 is placed in opening 18 of outer member 12 and tapered means 16 is engaged with inner member 14 via the interaction of threads 34 and threads 24. Upon the tightening of tapered means 16 into inner member 14, outer wall 28 of inner member 14 is forced outwardly into engagement with inner wall 32 of outer member 12 for forming a connection. While a cylindrically shaped device is shown, it is to be understood that various other shapes may be used.

In this manner, as described above and in the following embodiments, an expansion system is provided for connecting mating components and/or for adjusting the relative dimensional fit between two mating components for finely adjusting clearances and/or for compensating for tolerances and dimensional variations between the components.

Figure 2:
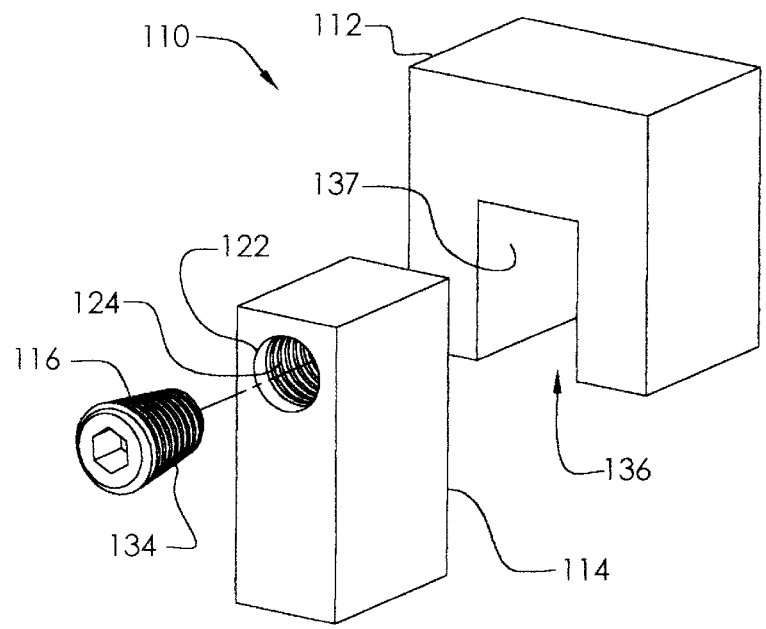
FIG. 2 is an exploded perspective view of another embodiment of the connection device of the present invention, including a partially surrounding outer member.

Another embodiment of the connection device is shown in FIG. 2 and is designated generally as 110. Similar to device 10, connection device 110 includes an outer member 112, an inner expansible member 114 and a tapered means 116. In this embodiment, outer member 112 does not entirely surround inner member 114 and, as shown in FIG. 2, preferably comprises rectangularly shaped sections with an open sided rectangular recess 136 therein, defined by walls 137. Recess 136 is adapted to receive inner expansible member 114, similar in shape to recess 136, but slightly smaller in size so as to fit therein. As with device 10, tapered means 116, including male threads 134, engages female threads 124 in an opening 122 of inner expansible member 114. Accordingly, inner expansible member 114 is placed into recess 136 and tapered means 116 is screwed into opening 122. The tapered means functions to expand inner expansion member 114 into engagement with the walls 137 of recess 136 of outer member 112 to form a connection.

Figure 3:
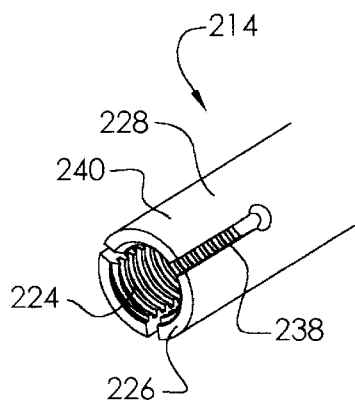
FIG. 3 is a perspective view of another embodiment of the inner expansible member.

Referring now to FIG. 3, another embodiment of the inner expansible member, preferably for use with the device shown in FIG. 1, is shown. Inner member 214, which is similar in design to inner member 14, is also cylindrical in shape, although other shapes such as rectangular or multi sided shapes can be used. Inner member 214 includes a plurality of through slots 238 extending from end 226 thereof, in the axial direction. Accordingly, a plurality of substantially unconnected leaves 240 are formed, it being understood, however, that just a singular leaf may be advantageously used, each leaf having an outer wall 228 and an inner surface defining an opening through inner member 214, including tapered female threads 224. Slots 238, and accordingly unconnected leaves 240, allow for easier expansion of inner member 214 via the tapered means (not shown), which is of the same design and which is used in the same manner as discussed above for the FIGS. 1 and 2 embodiments.

Figure 4:
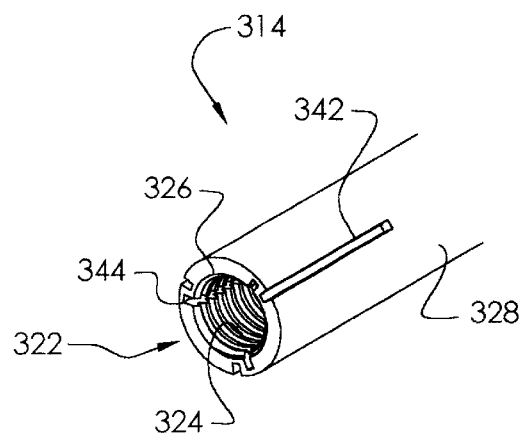
FIG. 4 is a perspective view of yet another embodiment of the inner expansible member.

FIG. 4 is a perspective view of another embodiment of the inner expansible member and is designated generally as 314. Inner member 314 includes an outer wall 328, and an opening 322 therethrough, including tapered threads 324 at end 326 thereof. Outer wall 328 includes a plurality of weakened sites, it being understood, however, that just a single weakened site may be advantageously used, preferably in the form of grooves 342, and inner tapered thread 324 also includes a plurality of weakened sites 344, also preferably in the form of grooves in the surface. Grooves 342 and 344 are for enhancing the expansion capacity of inner member 314 via tapered means, not shown but similar to the embodiments described above, while member 314 is located within the outer member, not shown, but which is similar to as described above in FIGS. 1 and 1A.

Figure 5:
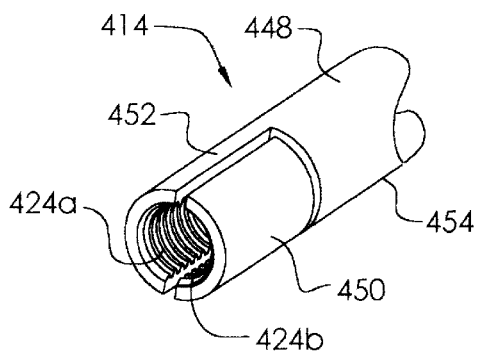
FIG. 5 is perspective view of still another embodiment of the inner expansible member.

FIG. 5 is a perspective view of another embodiment of an inner expansible member for use in the embodiment shown in FIG. 1, and is designated generally as 414. Inner member 414 preferably includes two parts, a base portion 448 and an unconnected free portion 450. Unconnected portion 450 is preferably in the form of a half cylinder, having an elongated U-shape while base portion 448 has a matching half-cylinder portion 452 which is connected with a cylindrical portion 454, preferably integrally. Accordingly, with unconnected portion 450 aligned with base portion 448 a substantially cylindrically shaped inner expansible member 414 is formed, similar to that shown in FIG. 1. Each of base portion 448 and unconnected portion 450 includes a threaded portion 424a and 424b, respectively, of tapered threads which together form a female threaded cavity for engagement with a tapered means (not shown), but similar to as that discussed above in FIGS. 1 and 2. Thus, inner member 414 is placed in an outer member, such as that shown in FIG. 1, in unconnected pieces, i.e., base 448 and unconnected portion 450, and similar to as described above for FIG. 1, the tapered means (not shown) is used to push base 448 and unconnected portion 450 outwardly against the inner surface of the outer connectable member as indicated in FIGS. 1 and 1A.

Figure 6:
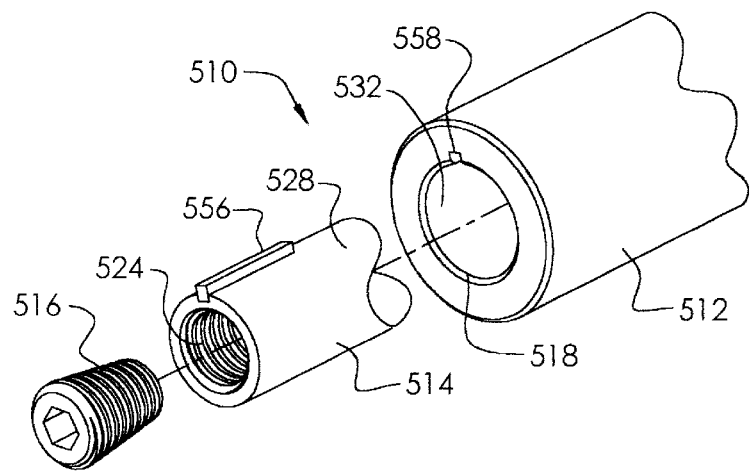
FIG. 6 is perspective exploded-view of another embodiment of the connection device in accordance with the principles of the present invention wherein the inner expansible member uses a key and the outer member uses a keyway.

Referring now to FIG. 6, a connecting device 510 is shown which is very similar to connecting device 10 and generally includes an outer member 512, an inner expansible member 514, and a tapered means 516. Outer member 512 includes opening 518 defining inner wall 532 adapted to engage outer wall 528 of inner member 514. Inner member 514, similar to as shown in FIG. 1, includes tapered threads 524 for engaging tapered means 516. In addition, inner member 514 includes a key 556 on outer wall 528 adapter to engage a keyway 558, formed in inner wall 532 of outer member 512. Accordingly, upon screwing tapered means 516 into inner member 514, while positioned in outer member 512, outer wall 528 of inner member 514 is expanded into engagement with walls 532 of outer member 512 and also, key 556 is expanded into frictional engagement with keyway 558, thereby enhancing the connection and enhancing anti slippage and anti rotation control. Alternatively, key 556 may be sized and positioned only to prevent relative rotation and further alternatively, key 556 may be placed in the inner diameter of outer member 512 and a keyway in the outer diameter of inner member 514.

Figure 7:
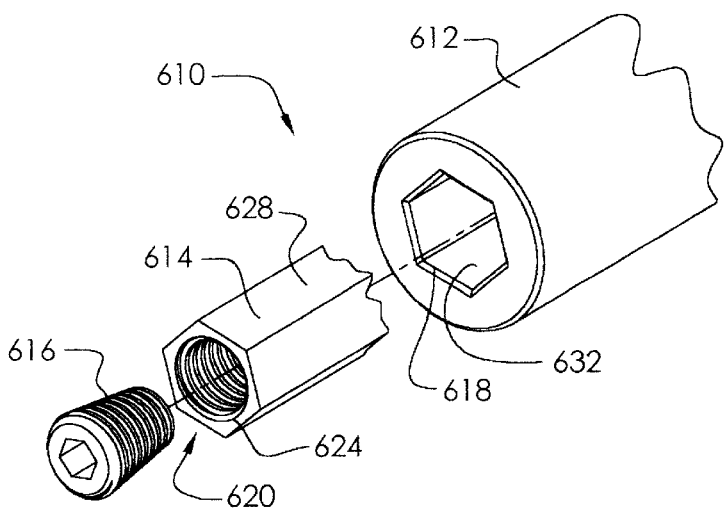
FIG. 7 is a perspective view of yet another embodiment of the connection device in accordance with the principles of the present invention, wherein the outside surface of the inner member is multi sided and the inside surface of the outer member is multi sided for enhancing the connection formed by the device.

Referring now to FIG. 7, another embodiment of the connection device by the principles of the present invention is shown and designated generally as 610. Device 610 includes an outer member 612 having an opening 618 therethrough for forming an inner wall 632 and an inner member 614 having an outer wall 628 and an opening 620 therethrough. In this embodiment, outer wall 628 of inner member 614 is preferably multi sided and not circular, including any number of sides, such as 6, 8, and 10 sides for forming hexagonal, octagonal, and pentagonal shapes, respectively. Of course, any number of sides for forming additional multi sided shapes can be used. Inner wall 632 of outer member 612 is therefore similarly shaped with respect to outer surface 628 so as to form a concentric configuration. Tapered means 616 is used similar to as described above for FIGS. 1 and 1A, in conjunction with tapered threads 624 of inner member 614, for expanding the multi sided outer wall 628 into engagement with a multi sided inner wall 632 of outer member 612.

Figure 8:
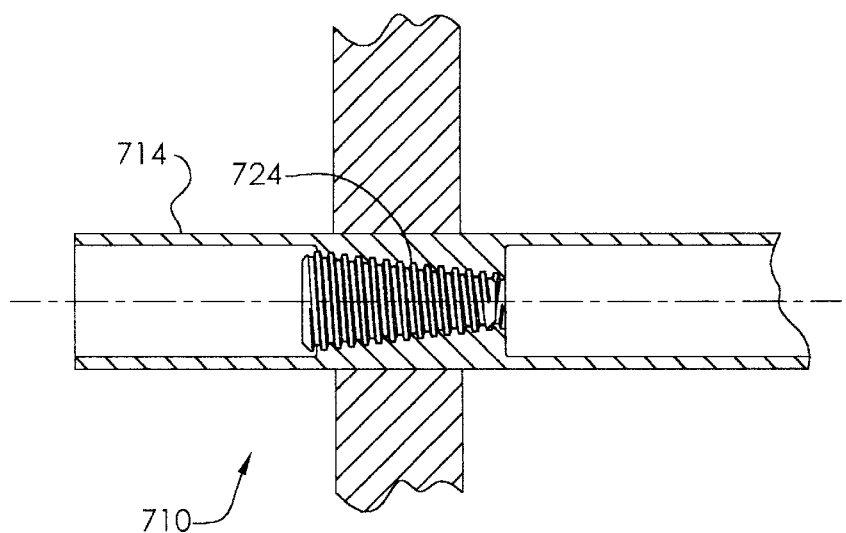
FIG. 8 is a cross-sectional view of another embodiment of the connection device in accordance with the principles of the present invention, wherein the inner member has tapered female thread for engaging a tapered means at an internal location.
Figure 8A:
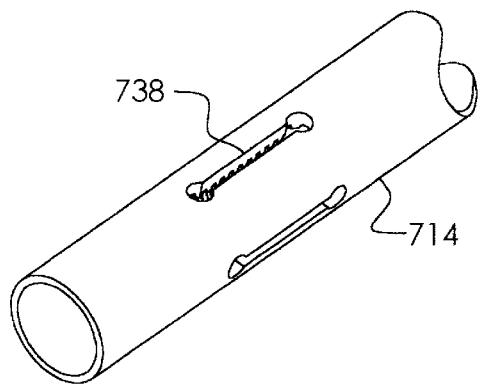
FIG. 8A is a perspective view of the inner member used in accordance with the device shown in FIG. 8.

In accordance with another embodiment of the present invention, and as shown in FIG. 8, female tapered threads 724 may be located at a distance from the end of inner expansible member 714, such that female tapered threads 724 are inset in member 714, as shown, for example, in the central area of member 714. Otherwise, connection device 710 may be substantially similar in design to any of the embodiments discussed above. As shown in FIG. 8A, and as a variation of the slots and leaves discussed above with reference to the embodiments of FIGS. 3, 4 and 5, inner expansible member 714 may include expansion enhancing slots 738 located in the wall thereof adjacent female thread 724.

Figure 9:
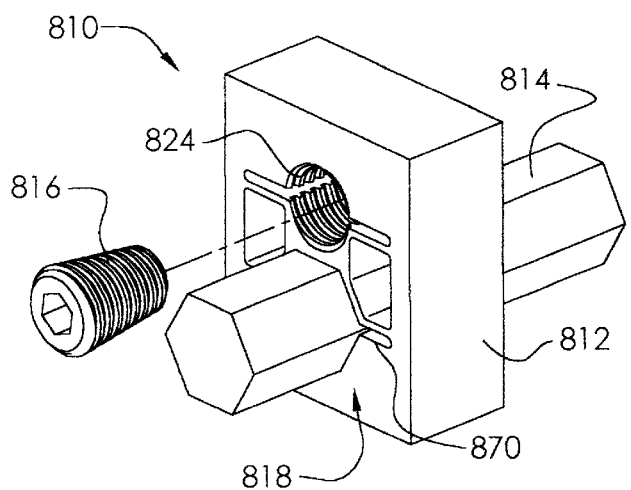
FIG. 9 is a perspective view of still another embodiment of the connection device, wherein the outer member is adapted to receive tapered means for compressing the same in engagement with an inner member.

Another embodiment designated as connecting device 810, is shown in FIG. 9, wherein instead of the tapered female thread being located in the inner expansible member, as shown in the above embodiments, the tapered thread is located in an outer contractible member 812. Accordingly, outer contractible member 812 includes an opening 818 for receiving inner member 814. Opening 818 has a shape in conformance with the perimeter shape of inner member 814. Opening 818 is only slightly larger than inner member 814 so that upon contraction of outer member 812, opening 818 is compressed into firm engagement with inner member 812. So as to assist in the compression of opening 818, opening 818 preferably includes relief areas 870 extending from the main portion thereof. In order to contract or compress opening 818, outer member 812 includes a tapered female thread 824, which is similar in design to the plurality of tapered female threads described above for the other embodiments. Tapered female thread 824 is positioned adjacent opening 818, close enough thereto to cause compression of the same. Accordingly, upon tightening of expansion means 816, opening 818 is compressed into engagement with inner member 814.

Figure 10:
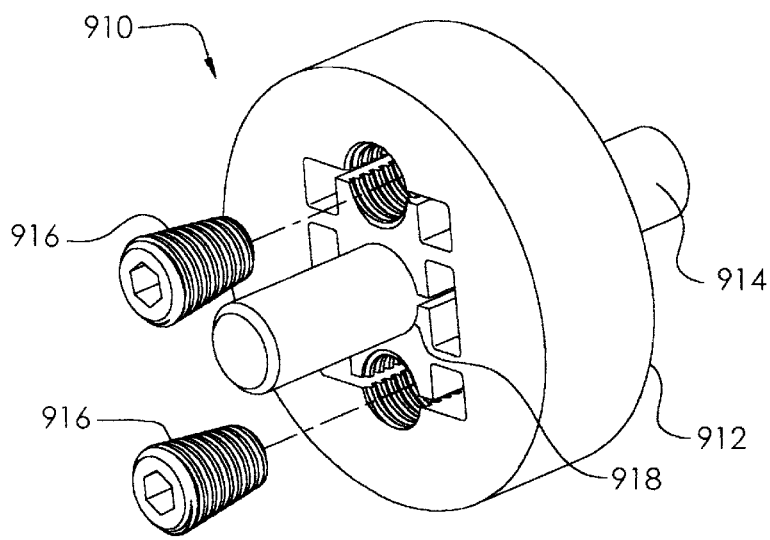
FIG. 10 is a perspective view of another embodiment of the connection device, similar to the embodiment of FIG. 9, wherein two or more tapered means are used in the outer member.

Referring now to FIG. 10, another embodiment is shown, which is designated as connection device 910. Similar to device 810, outer member 912 includes an opening 918 which is compressed into engagement with an inner member 914. In this embodiment, however, preferably two (2) or more tapered means 916 are used for precisely compressing openings 918 into engagement with inner member 914 and/or precisely adjusting the location of inner member 914 relative outer member 912. Such an arrangement can be used as shown, for adjusting the eccentricity of outer member 912, which is preferably in the form of a pulley, as shown, or for adjusting the alignment of inner member 914, which is preferably in the form of a shaft in the pulley.

Figure 11A:
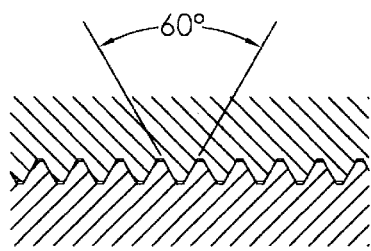
FIGS. 11A–11E are schematic representations of the various thread types which may be used in between the tapered means and inner member of the present invention.
Figure 11B:
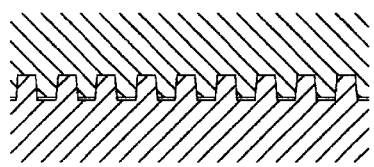
Figure 11C:
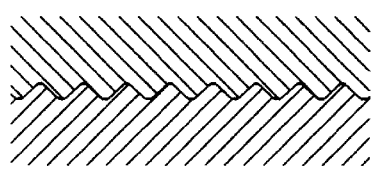
Figure 11D:
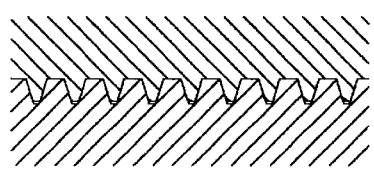
Figure 11E:
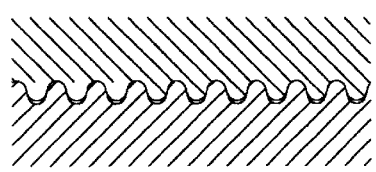

FIGS. 11A–11E show a variety of threads which may be used to form the mating tapered threads 34 and 24, and the similar threads shown in the other embodiments, of tapered means 16 and inner expandable member 14, respectively. FIG. 11A shows the least preferred thread type, i.e., the normal 60° conventional threads, wherein the crest of the female thread and the root of the male thread combination never come in contact. That is, all contact therebetween is flank to flank, as shown in FIG. 11A. Desirably, thread combinations wherein the crest and root are in contact, are used, providing for good expansion without wedging and galling inherent in standard thread forms. FIGS. 11B–11E are indicative of the more preferred thread types to be used in the present invention, having male root to female crest contact, for preventing thread galling and binding, and thereby allowing for further tightening of the tapered means into the inner member for increasing the strength of the connection between the inner and outer members. Accordingly, FIG. 11B shows a shallow-V thread form having a thread angle of greater than 60°. FIG. 11C shows an acme-type thread form having substantially rectangular threads. FIG. 11D shows a modified tapered acme thread form. And finally, FIG. 11E shows a sinusoidally shaped thread form. By using the thread forms shown in FIG. 11B–11E, Enhanced tightening of the tapered means 16 into the inner expansible member 14 is achieved, by substantially preventing galling and binding and thereby increasing the connection acquired between the inner expandable member 14 and outer member 12.

In operation, the connection devices of the present invention are preferably used to connect connectable elements. Accordingly, each of the inner and outer connectable members may be attached to or a part of connectable elements such as piping, tubing, pulleys, plates, and the like, which are to be connected. Further, the device may be used to replace a split collar and/or setscrew. In each of the embodiments discussed above, the inner member is placed and/or assembled inside the outer member, in the desired position for connection. In a majority of these embodiments, the tapered means is then screwed into the tapered threads of the inner member for expanding the inner member into engagement with the outer member. In the remaining embodiments, the tapered means is then screwed into the tapered threads of the outer member for compressing the outer member into engagement with the inner member. The tapered-means is torqued to a level where substantial engagement between the inner member and outer member provides the desired connecting force. In the case of the embodiment shown in FIG. 2, connectable elements having different types of shapes can also be connected. In the case of the embodiments shown in FIGS. 3 and 4, the slots and/or weakened sites allow for easier expansion of the inner member within the outer member. Also, the embodiment of FIG. 5 allows for even easier expansion of the inner member since the base portion and unconnected portion are unconnected and thereby not restricted by the more integral nature of the remaining embodiments. And in the case of the embodiments of FIGS. 6 and 7, the key and multi sided arrangements, respectively, function to further prevent slippage or unwanted rotation.

For the FIGS. 8 and 8A embodiment, the tapered means is positioned substantially centrally in the inner member for forming a connection at a centralized portion thereof. In the FIG. 9 embodiment, the outer member includes the tapered thread for engaging the tapered means, and also includes an opening for receiving an inner member. The opening of the outer member, via the tapered means, is compressed into engagement with the inner member. For FIG. 10, two or more tapered means are used in the outer member for accomplishing more precise surface engagements and alignments, with specific relevance to pulleys and their shafts.

The primary advantage of this invention is that an improved connecting device, which cures the defects of the prior art connection devices, is provided. Another advantage of this invention is that an improved connection device is provided including an inner expansible member and an outer surrounding member, which provides for substantially uniform frictional force distribution between inner and outer members. Still another advantage of this invention is that a connection device is provided including an expansible inner member and a partially surrounding outer member, wherein the inner member is expansible by a tapered means. And yet another advantage of this invention is that a connection device is provided including a surrounding outer member and an expansible inner member, wherein the expansible inner member comprises a base portion and a free portion unconnected to the base portion. And yet another advantage of this invention is that a connection device is provided including an inner expansible member and an outer member, wherein the inner expansible member is expandable via a tapered means and wherein the inner expandable member includes a plurality of weakened sites for enhancing expansion. And still another advantage of this invention is that a connection device is provided including an outer member and an expansible inner member, wherein the expansible inner member is expandable via a tapered means, and wherein the inner member includes a plurality of slots and accordingly, a plurality of leaves between the slots for expansion into connection with the outer member for enhancing expansion. And still another advantage of this invention is that a connection device is provided including an outer member and an expansible inner member, wherein the inner member includes a multi sided outer surface and the outer member includes a multi sided inner surface for engagement with the multi sided outer surface of the inner member for further anti slippage protection. Another advantage of this invention is that a connection device is provided including an outer member and an expansible inner member, wherein the expansible inner member includes a plurality of projections, preferably in the form of keys and the outer member includes a plurality of recesses, preferably in the form of keyways, for enhancing engagement of the inner member with the outer member and for further preventing slippage and/or rotation. And yet another advantage of this invention is that a connection device is provided including an outer member, an inner expansible member and a tapered means for expanding the inner member into engagement with the outer member, wherein the tapered means is engageable with the inner member via one of a plurality of thread forms which substantially prevent galling and binding. And still another advantage of this invention is that a connection device is provided including an outer partially compressible member, an inner member and a tapered means for compressing a portion of the outer member into engagement with the inner member, wherein the tapered means is engageable with the outer member via one of a plurality of thread forms which substantially prevent galling and binding. Another advantage of this invention is that an expansion system is provided for adjusting the relative dimensional fit between two mating components for finely adjusting clearances and/or for compensating for tolerances and dimensional variations between the components It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for forming a connection between connectable elements, comprising:

first connectable member means for facilitating said connection;

second connectable member means for facilitating said connection, said second connectable member means having an outer, substantially continuous peripheral surface adapted to engage said first connectable member means;

said first connectable member means including a means for receiving said second connectable member means comprising an inner substantially continuous surface for receiving said second connectable member means wherein at least one of said first and second connectable members is an expansible member;

at least one tapered element for one of compressing said first connectable member means into engagement with said second connectable member means and expanding said second connectable member means into engagement with said first connectable member means, while said second connectable member means is positioned in said means for receiving so that the peripheral surface of said second connectable member and the inner surface of said first connectable member are in engagement substantially around the entire inner surface of said first connectable member; and wherein at least one of said first connectable member means and said second connectable member means includes a tapered opening having means for securely engaging said tapered element, and wherein said engagement provides a substantially uniform force distribution between the first and second connectable members.

2. The device according to claim 1, wherein said means for securely engaging comprising threads adapted to engage mating threads on said tapered element.

3. The device according to claim 2, wherein said threads are shallow V-shaped threads having a greater than 60° thread angle.

4. The device according to claim 2, wherein said threads have an acme-type thread form having substantially rectangular threads and having male root to female crest contact.

5. The device according to claim 2, wherein said threads have a tapered acme type thread form with male root to female crest contact.

6. The device according to claim 2, wherein said threads have a sinusoidally shaped thread form with male root to female crest contact.

7. The device according to claim 1, wherein said first connectable member means is an outer member and said second connectable member means is an expansible inner member.

8. The device according to claim 7, wherein said outer member surrounds said inner member.

9. The device according to claim 7, wherein said expansible inner member is a solid inner member having outer circumferential dimensions, said solid inner member being expansible by circumferential expansion of said outer dimensions.

10. The device according to claim 7, wherein said inner member includes an inner and an outer surface and said outer member includes an inner and an outer surface, wherein said outer surface of said inner member and said inner surface of said outer member are adapted to engage each other, and wherein said outer surface of said inner member is multi sided and said inner surface of said outer member is multi sided for achieving relative rotational slippage control.

11. The device according to claim 10, wherein said outer surface of said inner member and said inner surface of said outer member are hexagonal in shape.

12. The device according to claim 11, wherein said inner member includes means for engagement with said tapered element while said inner member is positioned in said outer member.

13. The device according to claim 12, wherein said means for engagement comprises a tapered female thread and wherein said tapered element includes tapered male threads for engagement with said tapered female threads.

14. The device according to claim 1, wherein said tapered element comprises a tapered screw having tapered threads.

15. A device according to claim 1, wherein the outer surface of the second member substantially circumscribes said second member.

16. A device according to claim 15, wherein the inner surface of the first member substantially circumscribes the outer surface of said second member.

17. A device according to claim 16, wherein the first and second members are in locking engagement substantially around the entire outer surface of the second member.

18. A device according to claim 1, wherein the second member is a rod or bar-like element.

19. A device according to claim 1, including substantially full surface contact between the first and second members.

20. A device according to claim 1, wherein said second member is an annular member and said first member includes an annular channel for receiving said second member.

21. A device according to claim 1, wherein the tapered element has an axis, and at least one of said first and second connectable members has a flexure axis, wherein said flexure axis is parallel to the tapered element axis.

22. A device according to claim 1, wherein said tapered element induces deformation of one of said first and second connectable members, wherein the member to be deformed includes a substantially cylindrical surface and which remains substantially cylindrical after deformation.

23. A device according to claim 22, wherein said locking engagement provides a substantially uniform force distribution between the first and second connectable members.

24. A device according to claim 1, wherein said tapered element is for one of compressing said first connectable member means into locking engagement with said second connectable member means and expanding said second connectable member means into locking engagement with said first connectable member means, and wherein the peripheral surface of the second connectable member and the inner surface of the first connectable member are in locking engagement.

* * * * *